United States Patent [19]

Senoo et al.

[11] Patent Number: 5,223,354
[45] Date of Patent: Jun. 29, 1993

[54] LEAD-ACID BATTERY PLATE AND ITS MANUFACTURING METHOD

[75] Inventors: Keiji Senoo; Takamasa Yoshida; Hideharu Ishikawa; Masao Takura, all of Takatsuki, Japan

[73] Assignee: Yuasa Battery Co., Ltd., Osaka, Japan

[21] Appl. No.: 900,768

[22] Filed: Jun. 19, 1992

Related U.S. Application Data

[60] Continuation of Ser. No. 706,709, May 29, 1991, abandoned, which is a division of Ser. No. 516,591, Apr. 30, 1990, Pat. No. 5,093,970.

[51] Int. Cl.⁵ .............................................. H01M 4/74
[52] U.S. Cl. ................... 429/242; 429/245; 429/246
[58] Field of Search ................. 429/241, 242, 245, 246

[56] References Cited

U.S. PATENT DOCUMENTS

| | | | |
|---|---|---|---|
| Re. 33,133 | 12/1989 | Kiessling | 429/242 |
| 441,959 | 12/1890 | Kennedy | 429/241 X |
| 1,126,671 | 1/1915 | Wilson | 429/211 X |
| 4,548,882 | 10/1985 | Shima et al. | 429/246 X |
| 4,554,228 | 11/1985 | Kiessling | 429/242 |
| 4,760,001 | 7/1988 | Nann et al. | 429/136 |

Primary Examiner—Stephen Kalafut
Attorney, Agent, or Firm—Armstrong, Westerman, Hattori, McLeland & Naughton

[57] ABSTRACT

This invention provides a lead-acid battery plate and its manufacturing method. In a lead-acid battery plate making use of an expanded metal comprising copper or copper alloy electroplated with lead or lead alloy for its grid; this invention is characterized by that a protector is provided on a side of the grid. And in a manufacturing method for a lead acid battery plate in which the expanded metal comprising copper or copper alloy electroplated with lead or lead alloy is used for its grid, and a plate lug comprising lead or lead alloy is connected by casting to an upper part of the grid; this invention is characterized by that the plate lug is first connected by casting to the upper part of the copper expanded metal, and lead or lead alloy is then electroplated on the copper expanded metal to which the plate lug is connected.

4 Claims, 2 Drawing Sheets

LEAD-ACID BATTERY PLATE AND ITS MANUFACTURING METHOD

This application is a continuation of application Ser. No. 706,709 filed May 29, 1991, now abandoned, which is a division of application Ser. No. 516,591 filed Apr. 30, 1990, now U.S. Pat. No. 5,093,970.

BACKGROUND ART 1. (Industrial useful field)

This invention relates to a lead-acid battery plate making use of copper for a grid and its manufacturing method.

2. (Prior art and its problem)

Generally, lead alloy has been used for a grid for a lead-acid battery plate.

In a lead-acid battery making use of a grid comprising lead alloy for its plate, however, an electric resistance of the lead alloy is as high as about 21 $\mu\Omega$-cm, so that an ohmic resistance polarization due to a grid resistance becomes large to cause a drop of discharge voltage when the battery is discharged with a large current. Further, a specific gravity of the lead alloy is as large as 11 so that a weight efficiency is low. Moreover, when a height of the plate increases, a grid resistance gives a large influence on battery characteristics, so that only an upper part of plate provided with a plate lug is concerned with charge and discharge reactions and a lower part thereof is not concerned with them. For this reason, the grid made of lead alloy has not been suitable for use in a tall plate composing a large lead-acid battery.

Therefore, the use of copper having a better electric conductivity than lead alloy was proposed, and a plate as illustrated by FIG. 7 making use of an expanded metal comprising copper as the grid has been adopted. In FIG. 7, 1 is a plate lug comprising lead alloy, 2 3 is a grid made of the expanded metal comprising copper on which lead alloy or lead tin alloy is electroplated, is a negative active material, and 4 is a lower connection body. Here, the reason why the lead alloy or lead-tin alloy is electroplated on the grid 2 is that the copper dissolves in electrolyte of the battery to cause an increase in self-discharge, a reduction in capacity, and a lowering of charging efficiency etc.

However, since a lead layer is soft, a side layer of the grid is especially apt to be scratched in pasting and formation of later process and the copper is exposed so that the foregoing problem has occurred. Further, since a side of the grid is rough, the active material 3 adhering to its side falls down during operation of the battery and becomes sponge-like shape to cause short-circuit so that a service life of the battery has been exhausted in a short period. There is a method where the active material 3 adhering to its side is removed in a later process in order to avoid this short-circuit, however, a number of process has been increased and the layer has been scratched to expose the copper in this method.

The plate as illustrated by FIG. 7 has conventionally been manufactured in such a way that the lead alloy or lead-tin alloy is electroplated on the copper expanded metal and then the plate lug 1 is connected thereto by casting.

Since the layer covering on the copper has a melting point lower than a melting temperature of the lead alloy to be cast, the layer around a boundary surface between the grid 2 and the plate lug 1 has been molten to become thin or peeled off, in an extremely case, to cause the copper to be exposed during the casting. In order to prevent the copper from being exposed, a double electroplating layer structure has been employed: the first electroplating layer of lead-tin alloy or tin alloy which is easy to be alloyed with copper, and the second electroplating layer of lead. However, this method has not been able to completely prevent the layer from peeling off.

Further, there is such a method that a casting temperature is strictly controlled so as to carry out the casting as low temperature as possible. In this method, however, a failure in forming the plate lug 1 has occurred and fitting the connection between the grid 2 and the plate lug 1 has become weak so that a grid resistance has increased.

SUMMARY OF THE INVENTION

An object of the invention is to provide a lead acid battery plate of excellent quality and productivity, and to provide a manufacturing method for a lead acid battery plate capable of obtaining a lead acid battery plate of excellent quality and productivity.

This invention provides a lead-acid battery plate and its manufacturing method. In a lead-acid battery plate making use of an expanded metal comprising copper or copper alloy electroplated with lead or lead alloy for its grid; this invention is characterized by that a protector is provided on a side of the grid. And in a manufacturing method for a lead-acid battery plate in which the expanded metal comprising copper or copper alloy electroplated with lead or lead alloy is used for its grid, and a plate lug comprising lead or lead alloy is connected by casting to the upper part of the grid; this invention is characterized by that the plate lug is first connected by casting to the upper part of the copper expanded metal, and lead or lead alloy is then electroplated on the copper expanded metal to which the plate lug is connected.

DETAILED DESCRIPTION OF THE INVENTION

Figure 1:
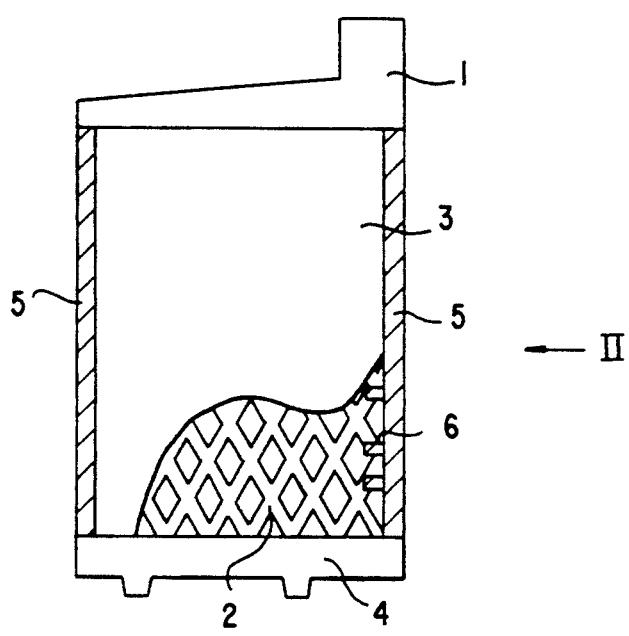
FIG. 1 is a partially cut-away view showing a lead-acid battery plate according to this invention.
Figure 2:
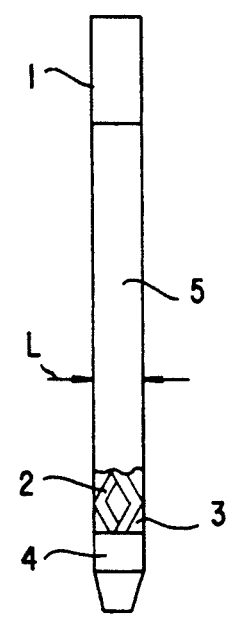
FIG. 2 is a partially cut-away view viewed in an arrow II of FIG. 1.

An embodiment of lead-acid battery plate of this invention will be described first with reference to the drawings. FIG. 1 is the partially cut-away view showing the lead-acid battery plate according to this invention, and FIG. 2 is the partially cut-away view viewed in the direction of arrow II of FIG. 1. In both figures, 1 is a plate lug comprising lead alloy, and 2 is a grid in which lead is plated on a copper expanded metal. 3 is a negative active material, 4 is a lower connection body made of synthetic resin, 5 is a protector comprising lead alloy, and 6 is a projection formed on the protector 5 at plural places. The protector 5 is a plate-like body having an area as large as covering the entire side surface of the grid 2, and its width (L of FIG. 2) is larger than a thickness of the grid 2.

Figure 3:
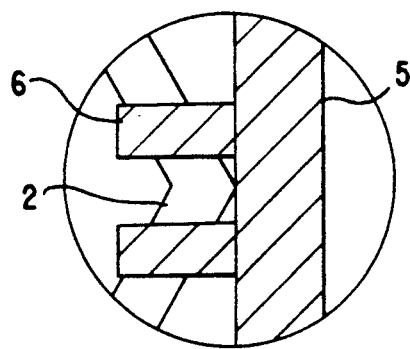
FIG. 3 is an enlarged view showing a fitting structure of a protector in the lead-acid battery of FIG. 1.

Such a plate is manufactured, for example, as follows. A sheet made of copper is first subjected to an expanding work to obtain a copper expanded metal. This metal is then subjected to degreasing, acid treatment, cleaning, drying and soldering works in order; and finally it is electroplated with lead. Thereby, the grid 2 is obtained. The plate lug 1 is connected by casting to an upper part of the grid 2, and the lower connection body 4 is then fitted to a lower part of the grid 2. The projections 6 of the protector 5 are made fit in a side of the grid 2, the protector 5 being connected to the grid 2 through the projections 6 by means of solder of lead-tin alloy as illustrated by FIG. 3. The electroplating sequence of lead on the copper expanded metal and the connecting fitting sequence of the plate lug 1, the lower connection body 4 and the protector 5 are not limited to the foregoing. The copper expanded metal may be first electroplated with lead after connecting the protector 5 thereto; and then the plate lug 1 may be casted and the lower connection body 4 may be fitted to the said expanded metal with the protector 5 connected, for example. Further, the copper expanded metal may be first plated with lead after connecting the plate lug 1 and the protector 5 to the copper expanded metal, and the lower connection body 4 may then be fitted thereto. Thereafter, the active material 3 is pasted in the grid 2 by a usual method and the formation is carried out. Thereby, the plate according to the present invention can be obtained.

In the lead-acid battery plate having such a structure, since the protector 5 having a width (L of FIG. 2) larger than a thickness of the grid 2 is provided on the side of the grid 2, the copper is not exposed due to the scratched lead layer of the grid 2 especially when pasting the active material 3. Further, since the active material 3 can be pasted on the basis of the protector 5, the grid 2 is covered with the active material 3 and the lead layer becomes hard to react during charging and discharging so that the copper is not exposed due to breakage of the layer during operation of battery. Moreover, since the active material 3 can be pasted on the basis of the protector 5, a workability of pasting i.e. a productivity of plate can be improved considerably. Furthermore, since the grid 2 is made of the copper, a charging voltage characteristic and a weight efficiency are very excellent.

Incidentally, the plate lug 1 may be made of lead, the grid 2 may be made of copper alloy, and the lower connection body 4 may be made of lead or lead alloy. The grid 2 may be that electroplated with lead alloy.

The protector 5 may be provided on a central part of or only a part of the grid 2.

Figure 4:
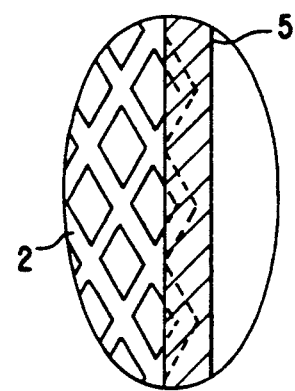
FIG. 4 and FIG. 5 are enlarged views showing another embodiments of fitting structure of protector, respectively.

The protector 5 may be made of lead or synthetic resin. The synthetic resin protector 5 may be fitted to the side of the grid 2 through the projections 6 by means of thermal adhesion or adhesion utilizing ultrasonic wave, hot-melt or epoxy resin etc. Further, it may be fitted thereto by means of injection molding as illustrated by FIG. 4.

Figure 5:
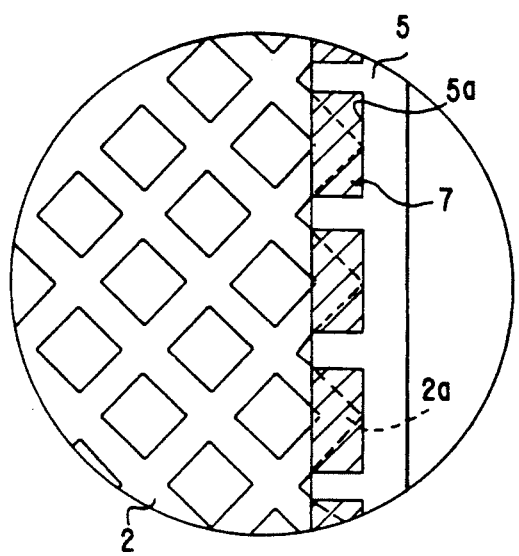
Figure 7:
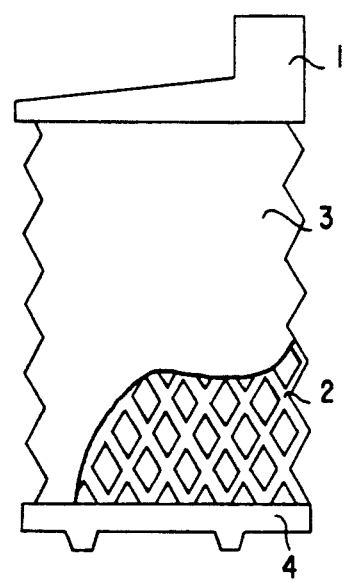
FIG. 7 is a partially cut-away view showing a conventional lead-acid battery plate.

The protector 5 may be fitted to the grid 2 by inserting convex portions 2a on the side of the grid 2 in plural concave portions 5a formed on the protector 5 and using a solder or a resin 7, as illustrated by FIG. 5. Moreover, it may be fitted thereto by adhering two protectors using ultra-sonic wave or by applying and heating paste-like solder.

According to the lead-acid battery plate as described above, the scratching of electroplated layer of the side of the grid 2 can be avoided in later process because the protector 5 is provided on the side of the grid 2. Consequently, the increase in self-discharge, reduction in capacity and lowering of charging efficiency due to exposed copper can be avoided. Further, since the active material 3 can be pasted on the basis of the protector 5, the exposure of copper during operation of the battery can be prevented and the workability of pasting i.e. the productivity of plate can be improved. Especially, when the width (L of FIG. 2) of the protector 5 is set more of the thickness of grid 2, the scratching of electro-plated layer of the grid 2 is avoided to prevent the copper from being exposed at the time when the active material 3 is pasted. Moreover, since the protector 5 may be made any of synthetic resin, lead or lead alloy, these materials can be used properly depending on an application of the plate. Furthermore, when the protector 5 is fitted to the grid 2 by fitting the convex portions 2a of the grid 2 side in the concave portions 5a or by inserting the projections 6 into the side of the grid 2, the protector 5 can be fitted to the grid 2 firmly and the fitting work can be done easily.

Figure 6:
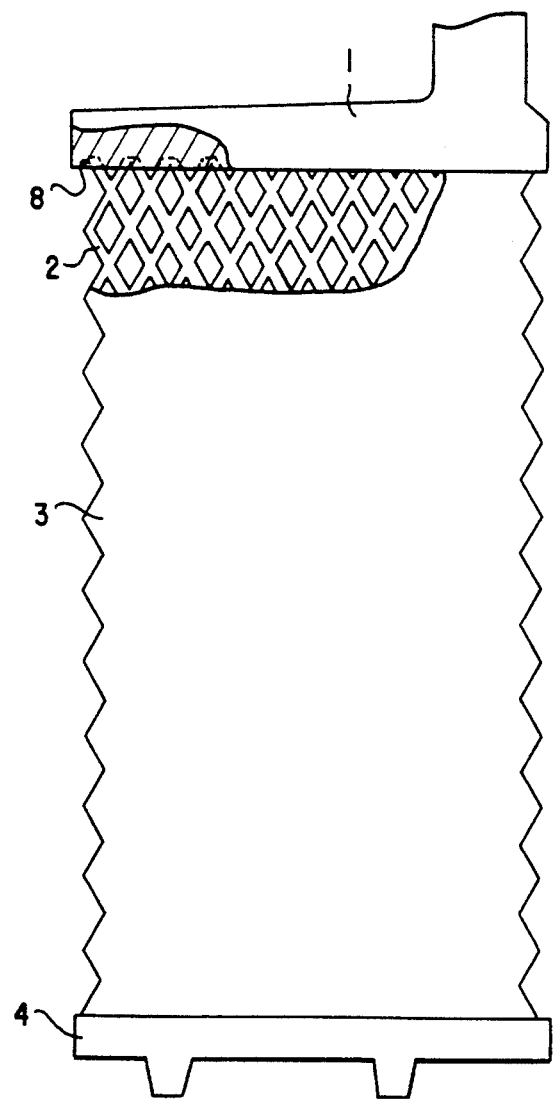
FIG. 6 is a partially cut-away view showing a lead-acid battery plate manufactured by a manufacturing method for lead-acid battery plate of this invention.

An embodiment of the manufacturing method of the lead-acid battery plate of the present invention will be described hereunder with reference to the drawings. FIG. 6 is the partially cut-away view showing the lead-acid battery plate manufactured by the manufacturing method of this invention. In this figure, same symbols as FIG. 1 and FIG. 2 indicate the same or corresponding components. 8 is a layer of tin or lead-tin alloy.

The manufacturing method will be described hereunder. In the first place, a sheet comprising copper is punched or expanded using an expanding machine to obtain the copper expanded metal which is a base material of the grid 2. In the next place, the copper expanded metal is cut to a size of plate and protruding parts of both upper and lower end are flattened. Thereby, casting of the plate lug 1 to the copper expanded metal becomes easy and fitting of the lower connection body thereto becomes simple.

Then, tin or lead-tin alloy is electroplated on the upper end of the copper expanded metal (8 of FIG. 6). Thereby, the connection between the plate lug 1 and the copper expanded metal becomes tight. Usually, a solder with low melting point having lead of a mass percentage of 50 to 70% is preferable for the lead-tin alloy. In order to increase connecting strength, it is recommended to add a metal of third component such as Sb alloy, Ag, Bi, Cd etc. to the tin or lead-tin alloy to be electroplated. The layer 8 of tin or lead-tin alloy may be applied on the entire surface of the copper expanded metal. There are two electroplating methods: a method wherein the copper expanded metal is subjected to the degreasing and acid treatment, and then to the electroplating; and a method wherein the copper expanded metal is subjected to the acid treatment and flux treatment, and then to a hot dipping by being dipped in a soldering bath.

The copper expanded metal is then fixed to a mold, and molten lead alloy is poured in the mold to form the plate lug 1.

The plate lug 1 is grasped to hang up the copper expanded metal, and it is dipped in a cleaning bath of degreasing or acid treatment etc. and then in the lead soldering bath. In the soldering bath, the lead is connected to a positive electrode and the copper expanded metal with the plate lug 1 is connected to a negative electrode respectively, and they are energized to carry out the electroplating work. An energizing time differs depending on purpose of battery, however, it usually is so determined as to form an electroplating layer of 20 to 300 microns. The thickness of 20 to 300 microns means a thickness that can overcome breakages during manufacturing process of plate and withstand charging and discharging during operation of the battery. In order to evenly electroplate clearances between meshes of the copper expanded metal which are hard to be electroplated; lead-tin alloy may be electroplated thereto, or two-layer plating may be employed wherein lead-tin alloy is electroplated and then lead is further electroplated thereon. Thus, surfaces of the copper expanded metal with the plate lug 1 is electroplated to obtain the grid 2. In order to electroplate the entire surface of the copper expanded metal, a part of the plate lug 1 is also electroplated.

After cleaning and drying the grid 2, the lower connection body 4 is fitted to a lower part of the grid 2. The lower connection body 4 may be made of lead or lead alloy in the same way as the plate lug 1, however, that made of synthetic resin is preferably used in general because the lower connection body 4 is a part requiring no current collection, a weight can be lessened and its cost can be reduced. Thereby, the active material 3 is pasted to obtain the plate as shown in FIG. 6.

The plate lug 1 may be made of lead. The grid 2 may be formed by using a sheet comprising copper alloy, and may be formed by a punching work in place of the expanding work. The grid 2 may be formed by electroplating lead alloys other than the lead or lead-tin alloy on the copper expanded metal.

The battery was assembled by using the plate thus obtained and was subjected to the following tests.

Various batteries (designated as A through D hereunder) were manufactured, five cells for each, wherein five positive electrodes making use of the usual grid made of lead alloy were combined with six negative electrodes manufactured by various methods using the copper expanded metal.

The A battery is one which makes use of the plate according to the present invention. The plate is formed in such a way that an upper part of the copper expanded metal is electroplated with solder and the plate lug is cast thereon, and 100-microns-thick lead is then electroplated on the copper expanded metal to which the plate lug is connected by casting.

The B battery is one which makes use of a plate manufactured by omitting the electroplating of solder on the upper part of the copper expanded metal in the manufacturing process of the A battery.

The C battery is one which makes use of a plate manufactured by a conventional method. The plate is formed in such a way that 10-microns thick lead-tin alloy is electroplated on the copper expanded metal and 90-microns thick lead is further electroplated thereon, and the plate lug is cast thereon.

The D battery is one which makes use of a plate manufactured by omitting the electroplating of lead-tin alloy in the manufacturing process of the C battery and electroplated with 100-microns thick lead.

In the first place, each battery was discharged at a current of five hour rate up to a final discharging voltage of 1.70 V, and then charged up to 120% of discharged capacity. After repeating the discharging and charging for 10 cycles, 10 cc of electrolyte was taken out at the final of discharging and a dissolving quantity of copper was examined. The results are listed in Table 1. In an eleventh cycle, the battery was discharged up to the final discharging voltage of 1 70 V and shunted and held as it was for 24 hours, 10 cc of electrolyte was take out, and then the dissolving quantity of copper was investigated in the same manner. The results are listed in Table 2. The dissolving quantity of copper is indicated in p.p.m. and numerical numbers 1 through 5 indicate a cell number in Tables 1 and 2.

TABLE 1

|   | 1 | 2 | 3 | 4 | 5 | Mean |
|---|---|---|---|---|---|---|
| A | 0.2 | 0.6 | 0.8 | 0.7 | 0.9 | 0.6 |
| B | 2.3 | 10.5 | 7.0 | 1.3 | 5.6 | 5.3 |
| C | 8.4 | 16.8 | 7.2 | 21.5 | 4.9 | 11.8 |
| D | 15.6 | 81.3 | 10.8 | 61.2 | 38.4 | 41.5 |

TABLE 2

|   | 1 | 2 | 3 | 4 | 5 | Mean |
|---|---|---|---|---|---|---|
| A | 0.7 | 0.9 | 0.8 | 0.8 | 1.2 | 0.9 |
| B | 11.3 | 20.5 | 9.8 | 2.1 | 7.4 | 10.2 |
| C | 81.6 | 319.2 | 61.3 | 516.5 | 98.8 | 215.5 |
| D | 416.7 | 2928.5 | 516.8 | 1773.7 | 964.6 | 1320.1 |

As seen from Tables 1 and 2, the battery making use of the plate according to this invention is very excellent because of its small dissolving quantity of copper. Especially, the dissolving quantity of copper is small even under overdischarging state.

In the next place, each battery was discharged at a current of five hour rate up to the final discharging voltage of 1.70 V, a charging of twelfth cycle was carried out, and a-discharging duration was investigated. The results are listed in Table 3.

TABLE 3

|   | Max. to Min. | Mean |
|---|---|---|
| A | 5°15′ to 5°26′ | 5°18′ |
| B | 4°52′ to 5°09′ | 5°01′ |
| C | 3°56′ to 4°39′ | 4°20′ |
| D | 3°26′ to 4°01′ | 3°52′ |

As seen from Table 3, the capacity of the battery making use of the plate of this invention is large even after being shunted and left as it is.

A battery voltage of each battery during charging becomes low in proportion to the dissolving quantity of copper in electrolyte, and a generation of hydrogen gas becomes large.

In the third place, each battery was sectioned and dissolving state of copper was examined. In the A battery of this invention, no dissolution of copper was found even in the active material. In the B battery, copper was dissolved in the vicinity of boundary surface between the plate lug and copper expanded metal. This was caused by the fact that the plate lug was not connected to the copper expanded metal tightly and a clearance existed therebetween so that the electroplating was not done completely. In the C battery, an electroplating layer in the vicinity of boundary surface between the plate lug and the copper expanded metal was dissolved to cause partial cracking, and copper was dissolved so that many quantity of copper was found in the active material. Further, in a part of the plate, copper was exposed due to breakage of electroplating layer occurred when casting the plate lug. In the D battery, the state was worse than that of the C battery, wherein the dissolving quantity of copper increased. In the battery manufactured according to the present invention as described above, the dissolution of harmful copper can be avoided.

According to the manufacturing method for a lead-acid battery plate of the present invention, the plate lug 1 is connected by casting to the upper part of the copper expanded metal, and lead or lead alloy is then electroplated on the copper expanded metal to which the plate lug 1 is connected. Therefore, the copper can be prevented from being exposed as encountered in a conventional battery due to thinning or peeling off of the electroplated layer of the grid 2 at the time of casting. Especially, when the tin or lead alloy is electroplated on the upper part of copper expanded metal before connecting the plate lug 1 thereto, the connection can be done well between the copper expanded metal and the plate lug 1. Accordingly, the increase in a grid resistance can be controlled, the dissolution of copper from the vicinity of boundary surface between the copper expanded metal and the plate lug 1 can be prevented, and a lead acid battery plate of excellent quality can be obtained.

What is claimed is:

1. A lead-acid battery plate comprising an expanded metal grid of copper or copper alloy electroplated with lead or lead alloy, active material adhering to said grid, a plate lug at one end, a connection body at its other end, and a protector fitted to both sides of said grid by inserting convex portions on the sides of said grid in plural concave portions formed on said protector, said protector extending along both edges of said grid between said plate lug and said connection body and covering the entire side surface of said grid, said protector being capable of avoiding scratching of an electroplated layer of said side surface of said grid and being capable of preventing falling down of said active material during operation of said battery plate.

2. A lead-acid battery plate as set forth in claim 1, in which the protector is made of synthetic resin, lead or lead alloy.

3. A lead-acid battery plate as set forth in claim 1, in which a width of the protector, measured in a direction of depth of the grid, is larger than a thickness of the grid.

4. A lead-acid battery plate comprising an expanded metal grid of copper or copper alloy electroplated with lead or lead alloy, active material adhering to said grid, a plate lug at one end, a connection body at its other end, and a protector fitted to both sides of said grid by inserting plural projections formed on said protector in the side of said grid between said plate lug and said connection body and covering the entire side surface of said grid, said protector being capable of avoiding scratching of an electroplated layer of said side surface of said grid and being capable of preventing falling down of said active material during operation of said battery plate.

* * * * *